US008856248B2

(12) United States Patent  (10) Patent No.: US 8,856,248 B2
Chen et al.  (45) Date of Patent: Oct. 7, 2014

(54) METHODS AND SYSTEMS FOR OPTIMIZING ENGAGEMENT WITH A SOCIAL NETWORK

(75) Inventors: David Y. Chen, Mountain View, CA (US); Emily B. Grewal, Palo Alto, CA (US); Ziqing Mao, Mountain View, CA (US); Denise Moreno, San Jose, CA (US); Kiranjit Singh Sidhu, East Palo Alto, CA (US); Amylee Thibodeau, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 93 days.

(21) Appl. No.: 13/440,921

(22) Filed: Apr. 5, 2012

(65) Prior Publication Data
US 2013/0268591 A1    Oct. 10, 2013

(51) Int. Cl.
*G06F 15/16*    (2006.01)
(52) U.S. Cl.
USPC ............ 709/206; 709/204; 709/205; 709/207
(58) Field of Classification Search
USPC ................................................ 709/204–207
See application file for complete search history.

(56) References Cited

U.S. PATENT DOCUMENTS

| 8,303,415 | B2 * | 11/2012 | Craine et al. ..................... 463/42 |
| 8,388,446 | B1 * | 3/2013 | Craine et al. ..................... 463/42 |
| 8,449,396 | B2 * | 5/2013 | Craine et al. ..................... 463/42 |
| 8,539,030 | B2 * | 9/2013 | Wang Baldonado et al. . 709/206 |
| 2008/0098125 | A1 * | 4/2008 | Wang Baldonado et al. . 709/231 |
| 2011/0246907 | A1 * | 10/2011 | Wang et al. ..................... 715/751 |
| 2011/0320533 | A1 * | 12/2011 | Belinsky et al. .............. 709/203 |
| 2012/0102114 | A1 * | 4/2012 | Dunn et al. ................... 709/204 |
| 2012/0102153 | A1 * | 4/2012 | Kemp et al. ................... 709/219 |
| 2012/0158843 | A1 * | 6/2012 | Angani et al. ................ 709/204 |

\* cited by examiner

*Primary Examiner* — Edward Kim
(74) *Attorney, Agent, or Firm* — Fenwick & West LLP

(57) ABSTRACT

Techniques to increase engagement with a social networking system. In one embodiment, activities are prioritized based on relatedness to a user. References associated with at least a portion of the prioritized activities are created. The references are categorized into a plurality of types. The reference types may include notifications, friend identifications, and top stories. The references are embedded in digest communications for the user. Descriptive information about the activities are omitted from the digest communications. Digest communications for the user are provided during a time period when the user is not engaged with the social networking system. Notifications for a user are ceased when a level of engagement of the user with the social networking system is less than a threshold value.

21 Claims, 10 Drawing Sheets

SOCIAL NETWORKING WEBSITE

Hi Jay,
You haven't been to our social networking website for a few days, and a lot happened while you were away.

👥 3 friend requests    💬 2 messages    🌐 6 notifications    — 412

Angela Baciagalupe, Taylor Radcliff, John Smith and 4 other friends have posted statuses, photos and more on our social networking website. — 414

You have missed some popular stories:

📷 Angela Baciagalupe and Rafael Nunez like Taylor Radcliff's photo

📄 John Smith, Bob Cruise, and Liam Condon like Susan Wilson's status. — 416

[Social Networking Website]    [See All Notifications] — 420

— 418

Your real-time notifications are off. You are subscribed to digests like this that highlight your friends' most popular activity. You can turn real-time email notifications back on at any time.
— 422
The message was sent to jdumphy@xyzmail.com. If you don't want to receive these emails from our social networking website in the future or have your email address used for friend suggestions, you can unsubscribe from us at SNW, Inc., 123 Elm Street, Eulidia, AK 01234.
— 424

Hi Jay,

We're trying out a new feature to reduce the amount of email you receive from us. Starting today, we are turning off most individual email notifications and instead, we'll send you a summary only if there are popular stories you may have missed You can turn individual emails back on and restore all your old settings at any time.

― 612

Thanks,
The social networking website team

---

The message was sent to jdumphy@xyzmail.com. If you don't want to receive these emails from our social networking website in the future or have your email address used for friend suggestions, you can unsubscribe from us at SNW, Inc., 123 Elm Street, Eulidia, AK 01234.

Are you sure you want to turn on individual email notifications?

Your individual email notifications have been turned off and you are now subscribed to digest emails that highlight your friends' most popular activity. It's a great way to keep up with your friends without getting lots of separate emails from Facebook.

Do you want to turn on individual email notifications?

---

Manage Notification Settings | Confirm | Cancel

We send notifications whenever actions are taken on the social networking website that involve you. You can change which applications and features can send you notifications.   722

Notifications are being sent to jdumphy@xyzmail.com (email) and 15555551234 (text message).

Now you can choose to receive summary emails instead of individual notifications:

☑ Send me less email in the form of summaries and important updates (recommended)

⎣ 720

| Search | | | Jay Dumphy  Find Friends  Home |

Notification Settings

Notifications are not being sent to jdumphy@xyzmail.com (email).

Recent Notifications

⎬ 712

All Notifications

714 ⎰

| Social Networking Website | 11 |
|---|---|
| Sends you a message | ☐ |
| Adds you as a friend | ☐ |
| Confirms a friend request | ☐ |
| Posts on your wall | ☐ |
| Pokes you | ☐ |
| Has a birthday coming up (weekly email) | ☐ |
| Asks to list you as family | ☐ |
| • | |
| • | |
| • | |
| Photos | 8 |
| Groups | 6 |
| Pages | 3 |
| Events | 9 |
| Questions | 5 |
| Notes | 11 |
| • | |
| • | |
| • | |

| Save Changes | Cancel |

FIGURE 7

METHODS AND SYSTEMS FOR OPTIMIZING ENGAGEMENT WITH A SOCIAL NETWORK

FIELD OF THE INVENTION

The present application relates to social networking and, in particular, systems and methods for optimizing engagement with a social networking system.

BACKGROUND

Social networking websites provide a dynamic environment in which members can connect to and communicate with other members. These websites commonly may provide online mechanisms allowing members to interact within their preexisting social networks as well as create new social networks. Members may include any individual or other entity, such as an organization or business. Among other attributes, social networking websites allow members to effectively and efficiently communicate relevant information to their social networks.

A member of a social network may highlight or share personal information, news stories, relationship activities, music, and any other content of interest to areas of the website dedicated to the member. Other members of the social network may access the shared content by browsing member profiles or performing dedicated searches. Upon access and consideration of the content, the other members may react by taking one or more responsive actions, such as providing an opinion about the content. The ability of members to interact in this manner fosters communications among them and helps to realize the goals of social networking websites.

However, members of a social networking website are not always engaged with the website. Some members may visit the website intermittently. Other members may visit the website only in rare instances. Their absence from the website generally detracts from their social network by diminishing the level and quality of communications among its members.

SUMMARY

To increase user engagement with a social networking system, embodiments of the invention provide communications to be sent to a user regarding activities that concern the social network of the user. In an embodiment of the invention, digest communications are periodically provided for the user. Measures of relatedness between the user and persons associated with activities in a social network are determined. Persons having highest measures of relatedness with the user are identified. Their activities are prioritized based on relevance to the user. References associated with at least a portion of the prioritized activities are created. The references are categorized into a plurality of types. The reference types may include, but are not limited to, pending notifications, friend identifications, and top stories. The references are embedded in digest communications for the user. The plurality of reference types are separately located in the digest communications. Descriptive information about the activities may be omitted from the digest communications to encourage the user to directly engage with the social networking system. Digest communications for the user are provided during a time period when the user is not engaged with the social networking system. Provision of the digest communications for the user may be timed at a first predetermined frequency. After the time period, provision of the digest communications for the user may be timed at a second predetermined frequency different from the first predetermined frequency.

In an embodiment of the invention, the provision of notifications for the user is ceased when the level of engagement of the user is sufficiently large. An engagement level of the user is defined based on engagement with the social networking system in a predetermined interval of time. The engagement level of the user with the social networking system is determined. A threshold value is set based at least in part on empirical data. The engagement level of the user is compared with the threshold value. It is determined whether the engagement level of the user is greater than or equal to the threshold value. If the answer is "Yes", provision of the notifications for the user is ceased. If the answer is "No", the notifications are provided for the user.

In an embodiment of the invention, the provision of digest communications and notifications may be managed in whole or part by the social networking system and the user.

Many other features and embodiments of the invention will be apparent from the accompanying drawings and from the following detailed description.

BRIEF DESCRIPTION OF THE DRAWINGS

FIG. 4 shows a digest communication in accordance with an embodiment of the invention.

FIGS. 6A-6B show messages provided by the social networking system regarding user management of notifications in accordance with an embodiment of the invention.

FIG. 7 shows a notification setting page to allow resumption of notifications in accordance with an embodiment of the invention.

Figure 1:
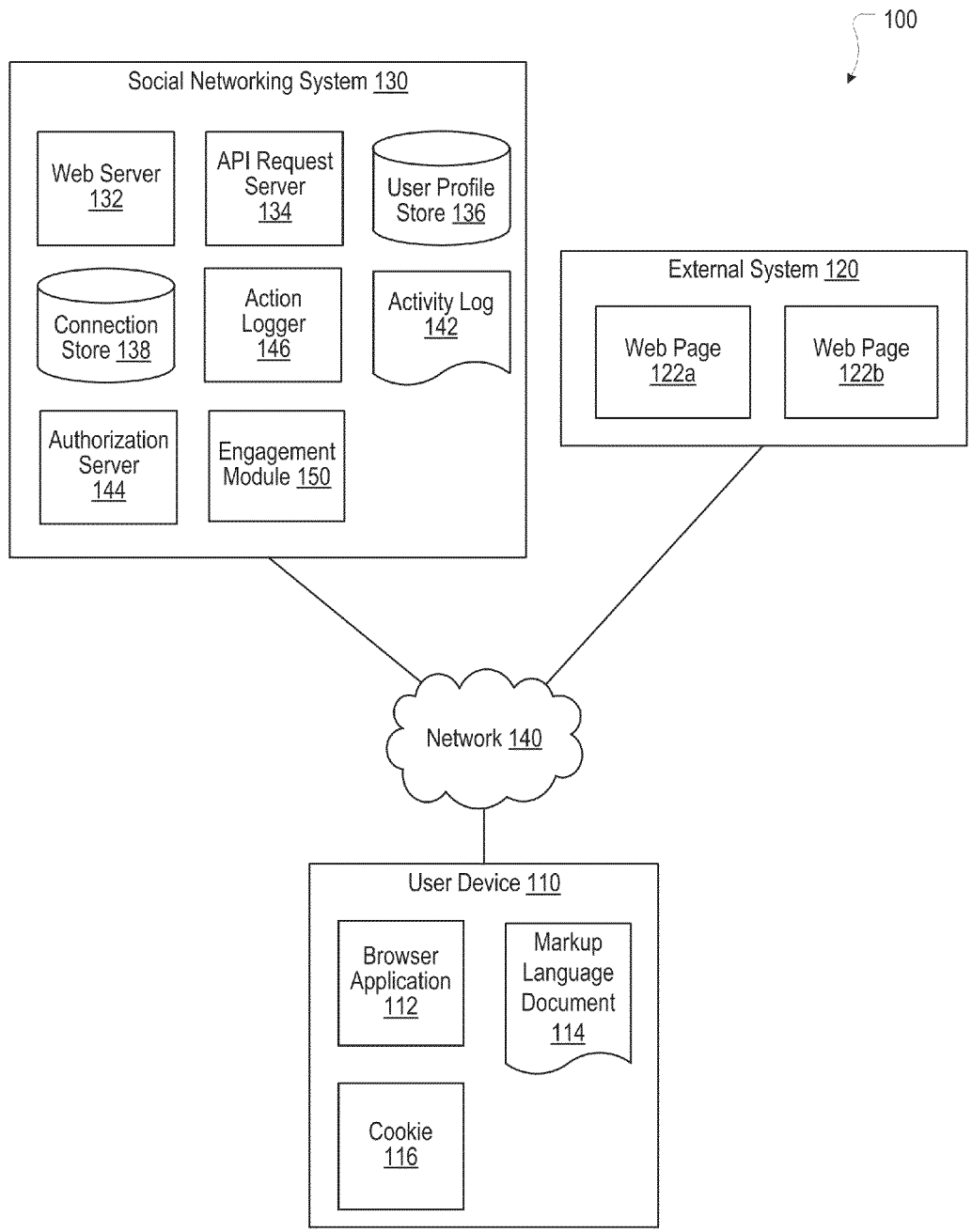
FIG. 1 is a network diagram of a system for optimizing engagement with a social networking system in accordance with an embodiment of the invention.

The figures depict various embodiments of the present invention for purposes of illustration only, wherein the figures use like reference numerals to identify like elements. One skilled in the art will readily recognize from the following discussion that alternative embodiments of the structures and methods illustrated herein may be employed without departing from the principles of the invention described herein.

DETAILED DESCRIPTION

Social Networking System Architecture

FIG. 1 is a network diagram of a system 100 for increasing engagement of users with a social networking system 130 in accordance with an embodiment of the invention. The system 100 includes one or more user devices 110, one or more external systems 120, the social networking system 130, and a network 140. For purposes of illustration, the embodiment of the system 100 shown by FIG. 1 includes a single external system 120 and a single user device 110. However, in other embodiments, the system 100 may include more user devices 110 and/or more external systems 120. In certain embodiments, the social networking system 130 is operated by a social network provider, whereas the external systems 120 are separate from the social networking system 130 in that they may be operated by different entities. In various embodiments, however, the social networking system 130 and the external systems 120 operate in conjunction to provide social networking services to users (or members) of the social networking system 130. In this sense, the social networking system 130 provides a platform, or backbone, which other systems, such as external systems 120, may use to provide social networking services and functionalities to users across the Internet.

The user device 110 comprises one or more computing devices that can receive input from a user and can transmit and receive data via the network 140. In one embodiment, the user device 110 is a conventional computer system executing, for example, a Microsoft Windows compatible operating system (OS), Apple OS X, and/or a Linux distribution. In another embodiment, the user device 110 can be a device having computer functionality, such as a smart-phone, a tablet, a personal digital assistant (PDA), a mobile telephone, etc. The user device 110 is configured to communicate via the network 140. The user device 110 can execute an application, for example, a browser application that allows a user of the user device 110 to interact with the social networking system 130. In another embodiment, the user device 110 interacts with the social networking system 130 through an application programming interface (API) that runs on the native operating system of the user device 110, such as iOS 4 and ANDROID. The user device 110 is configured to communicate with the external system 120 and the social networking system 130 via the network 140, which may comprise any combination of local area and/or wide area networks, using wired and/or wireless communication systems.

In one embodiment, the network 140 uses standard communications technologies and/or protocols. Thus, the network 140 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 140 can include multiprotocol label switching (MPLS), transmission control protocol/Internet protocol (TCP/IP), User Datagram Protocol (UDP), hypertext transport protocol (HTTP), simple mail transfer protocol (SMTP), and file transfer protocol (FTP). The data exchanged over the network 140 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 110 may display content from the external system 120 and/or from the social networking system 130 by processing a markup language document 114 received from the external system 120 and from the social networking system 130 using a browser application 112. The markup language document 114 identifies content and one or more instructions describing formatting or presentation of the content. By executing the instructions included in the markup language document 114, the browser application 112 displays the identified content using the format or presentation described by the markup language document 114. For example, the markup language document 114 includes instructions for generating and displaying a web page having multiple frames that include text and/or image data retrieved from the external system 120 and the social networking system 130. In various embodiments, the markup language document 114 comprises a data file including extensible markup language (XML) data, extensible hypertext markup language (XHTML) data, or other markup language data. Additionally, a markup language document 114 may include JavaScript Object Notation (JSON) data, JSON with padding (JSONP), and JavaScript data to facilitate lightweight data-interchange between the external system 120 and the user device 110. The browser application 112 on the user device 110 may use a JavaScript compiler to decode such a markup language document 114.

In one embodiment, the user device 110 also includes a cookie 116 including data indicating whether a user of the user device 110 is logged into the social networking system 130. The cookie 116 indicates whether the user of the user device 110 is involved in an active session where the user device 110 exchanges data with the social networking system 130, allowing modification of the data communicated from the social networking system 130 to the user device 110.

The external system 120 includes one or more web servers including one or more web pages 122a, 122b, which are communicated to the user device 110 using the network 140. The external system 120 is separate from the social networking system 130. For example, the external system 120 is associated with a first domain while the social networking system 130 is associated with a separate social networking domain. Web pages 122a, 122b included in the external system 120 comprise markup language documents identifying content and including instructions specifying formatting or presentation of the identified content.

The social networking system 130 comprises one or more computing devices storing a social network, or a "social graph", including a plurality of users and providing users of the social network with the ability to communicate and interact with other users of the social network. Users may join the social networking system 130 and then add connections to any number of other users of the social networking system 130 to whom they desire to be connected. As used herein, the term "friend" refers to any other user of the social networking system 130 to whom a user has formed a connection, association, or relationship via the social networking system 130.

Connections may be added explicitly by a user or may be automatically created by the social networking systems 130 based on common characteristics of the users (e.g., users who are alumni of the same educational institution). For example, a first user specifically selects a particular other user to be a friend. Connections in the social networking system 130 are usually in both directions, but need not be, so the terms "user" and "friend" depend on the frame of reference. Connections between users of the social networking system 130 are usually bilateral ("two-way"), or "mutual," but connections may also be unilateral, or "one-way." For example, if Bob and Joe are both users of the social networking system 130 and connected to each other, Bob and Joe are each other's connections. If, on the other hand, Bob wishes to connect to Joe to view data communicated to the social networking system 130 by Joe, but Joe does not wish to form a mutual connection, a unilateral connection may be established. The connection between users may be a direct connection; however, some embodiments of a social networking system 130 allow the connection to be indirect via one or more levels of connections or degrees of separation.

In addition to establishing and maintaining connections between users and allowing interactions between users, the social networking system 130 provides users with the ability to take actions on various types of items supported by the social networking system 130. These items may include groups or networks (where "networks" here refer not to physical communication networks, but rather social networks of people, entities, and concepts) to which users of the social networking system 130 may belong, events or calendar entries in which a user might be interested, computer-based applications that a user may use via the social networking system 130, transactions that allow users to buy or sell items via the service, and interactions with advertisements that a user may perform on or off the social networking system 130. These are just a few examples of the items upon which a user may act on a social networking system 130, and many others are possible. A user may interact with anything that is capable of being represented in the social networking system 130 or in the external system 120, separate from the social networking system 130, coupled to the social networking system 130 via the network 140.

The social networking system 130 is also capable of linking a variety of entities. For example, the social networking system 130 enables users to interact with each other as well as external systems 120 or other entities through an API or other communication channels. The social networking system 130 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 130. An edge between two nodes in the social graph represents a particular kind of connection, or association, between the two nodes, which may result from node relationships or from an action that was performed by one of the nodes on the other node. For example, when a first user identifies a second user as a friend, an edge in the social graph is generated connecting a node representing the first user and a second node representing the second user. As various nodes relate or interact with each other, the social networking system 130 modifies edges connecting the various nodes to reflect the relationships and interactions.

The social networking system 130 also includes user-generated content, which enhances a user's interactions with the social networking system 130. User-generated content may include anything a user can add, upload, send, or "post" to the social networking system 130. For example, a user communicates posts to the social networking system 130 from a user device 110. Posts may include data such as status updates or other textual data, location information, images such as photos, videos, links, music or other similar data and/or media. Content may also be added to the social networking system 130 by a third-party through a "communication channel", such as a newsfeed or stream. Content "items" represent single pieces of content that are represented as objects in the social networking system 130. In this way, users of the social networking system 130 are encouraged to communicate with each other by posting text and content items of various types of media through various communication channels. Such communication increases the interaction of users with each other and increases the frequency with which users interact with the social networking system 130.

The social networking system 130 includes a web server 132, an API request server 134, a user profile store 136, a connection store 138, an action logger 146, an activity log 142, an authorization server 144, and an engagement module 150. In an embodiment of the invention, the social networking system 130 may include additional, fewer, or different components for various applications. Other components, such as network interfaces, security mechanisms, load balancers, failover servers, management and network operations consoles, and the like are not shown so as to not obscure the details of the system.

The user profile store 136 maintains user profiles, including biographic, demographic, and other types of descriptive information, such as work experience, educational history, hobbies or preferences, location, and the like that has been declared by users or inferred by the social networking system 130. This information is stored in the user profile store 136 such that each user is uniquely identified. The social networking system 130 also stores data describing one or more connections between different users in the connection store 138. The connection information may indicate users who have similar or common work experience, group memberships, hobbies, or educational history. Additionally, the social networking system 130 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 130, such as non-person entities, buckets, cluster centers, images, interests, pages, external systems, concepts, and the like are also stored in the connection store 138.

The social networking system 130 maintains data about objects with which a user may interact. To maintain this data, the user profile store 136 and the connection store 138 store instances of the corresponding type of objects maintained by the social networking system 130. Each object type has information fields that are suitable for storing information appropriate to the type of object. For example, the user profile store 136 contains data structures with fields suitable for describing a user's profile. When a new object of a particular type is created, the social networking system 130 initializes a new data structure of the corresponding type, assigns a unique object identifier to it, and begins to add data to the object as needed. This might occur, for example, when a user becomes a user of the social networking system 130, and the social networking system 130 generates a new instance of a user profile in the user profile store 136, assigns a unique identifier to the user profile, and begins to populate the fields of the user profile with information provided by the user.

The connection store 138 includes data structures suitable for describing a user's connections to other users, connections to external systems 120 or connections to other entities. The connection store 138 may also associate a connection type with a user's connections, which may be used in conjunction with the user's privacy setting to regulate access to information about the user. In an embodiment of the invention, the user profile store 136 and the connection store 138 may be implemented as a federated database.

Data stored in the connection store 138, the user profile store 136 and the activity log 142 enables the social networking system 130 to generate the social graph that uses nodes to identify various objects and edges connecting nodes to identify relationships between different objects. For example, if a first user establishes a connection with a second user in the social networking system 130, user profiles of the first user and the second user from the user profile store 136 may act as nodes in the social graph. The connection between the first user and the second user stored by the connection store 138 is an edge between the nodes associated with the first user and the second user. Continuing this example, the second user may then send the first user a message within the social networking system 130. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 130 (or, alternatively, in an image maintained by another system outside of the social networking system 130). The image may itself be represented as a node in the social networking system 130. This tagging action may create edges between the first user and the second user as well as create an edge between each of the users and the image, which is also a node in the social graph. In yet another example, if a user confirms attending an event, the user and the event are nodes obtained from the user profile store 136, where the attendance of the event is an edge between the nodes that may be retrieved from the activity log 142. By generating and maintaining the social graph, the social networking system 130 includes data describing many different types of objects and the interactions and connections among those objects, providing a rich source of socially relevant information.

The web server 132 links the social networking system 130 to one or more user devices 110 and/or one or more external systems 120 via the network 140. The web server 132 serves web pages, as well as other web-related content, such as Java, Flash, XML, and so forth. The web server 132 may include a mail server or other messaging functionality for receiving and routing messages between the social networking system 130 and one or more user devices 110. The messages can be instant messages, queued messages (e.g., email), text and SMS messages, or any other suitable messaging format.

The API request server 134 allows one or more external systems 120 and user devices 110 to access information from the social networking system 130 by calling one or more APIs. The API request server 134 may also allow external systems 120 to send information to the social networking system 130 by calling APIs. The external system 120, in one embodiment, sends an API request to the social networking system 130 via the network 140, and the API request server 134 receives the API request. The API request server 134 processes the request by calling an API associated with the API request to generate an appropriate response, which the API request server 134 communicates to the external system 120 via the network 140. For example, responsive to an API request, the API request server 134 collects data associated with a user, such as the user's connections that have logged into the external system 120, and communicates the collected data to the external system 120. In another embodiment, the user device 110 communicates with the social networking system 130 via APIs in the same manner as external systems 120.

The action logger 146 is capable of receiving communications from the web server 132 about user actions on and/or off the social networking system 130. The action logger 146 populates the activity log 142 with information about user actions, enabling the social networking system 130 to discover various actions taken by its users within the social networking system 130 and outside of the social networking system 130. Any action that a particular user takes with respect to another node on the social networking system 130 is associated with each user's profile, through information maintained in the activity log 142 or in a similar database or other data repository. Examples of actions taken by a user within the social networking system 130 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 130, the action is recorded in the activity log 142. In one embodiment, the social networking system 130 maintains the activity log 142 as a database of entries. When an action is taken within the social networking system 130, an entry for the action is added to the activity log 142. The activity log 142 may be referred to as an action log.

Additionally, user actions may be associated with concepts and actions that occur within an entity outside of the social networking system 130, such as an external system 120 that is separate from the social networking system 130. For example, the action logger 146 may receive data describing a user's interaction with an external system 120 from the web server 132. In this example, the external system 120 reports a user's interaction according to structured actions and objects in the social graph. Other examples of actions where a user interacts with an external system 120 include a user expressing an interest in an external system 120 or another entity, a user posting a comment to the social networking system 130 that discusses an external system 120 or a web page 122a within the external system 120, a user posting to the social networking system 130 a Uniform Resource Locator (URL) or other identifier associated with an external system 120, a user attending an event associated with an external system 120, or any other action by a user that is related to an external system 120. Thus, the activity log 142 may include actions describing interactions between a user of the social networking system 130 and an external system 120 that is separate from the social networking system 130.

The authorization server 144 enforces one or more privacy settings of the users of the social networking system 130. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 120, or any entity that can potentially access the information. The information that can be shared by a user comprises user profile information like profile photo, phone numbers associated with the user, user's connections, actions taken by the user such as adding a connection, changing user profile information, and the like.

The privacy setting specification may be provided at different levels of granularity. For example, the privacy setting may identify specific information to be shared with other users. For example, the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 120. One embodiment allows the specification of the set of entities to comprise an enumeration of entities. For example, the user may provide a list of external systems 120 that are allowed to access certain information. Another embodiment allows the specification to comprise a set of entities along with exceptions that are not allowed to access the information. For example, a user may allow all external systems 120 to access the user's work information but specify a list of external systems 120 that are not allowed to access the work information. Certain embodiments call the list of exceptions that are not allowed to access certain information a "block list". External systems 120 belonging to a block list specified by a user are blocked from accessing the information specified in the privacy setting. Various combinations of granularity of specification of information and granularity of specification of entities with which information is shared are possible. For example, all personal information may be shared with friends whereas all work information may be shared with friends of friends.

The authorization server 144 contains logic to determine if certain information associated with a user can be accessed by a user's friends, external systems 120 and/or other applications and entities. The external system 120 may need authorization from the authorization server 144 to access the user's more private and sensitive information, such as the user's work phone number. Based on the user's privacy settings, the authorization server 144 determines if another user, the external system 120, an application, or another entity is allowed to access information associated with the user, including information about actions taken by the user.

User Engagement Management

The social networking system 130 includes the engagement module 150 to increase the level of engagement of users with the social networking system 130. The level of interaction among users and related engagement with the social networking system 130 may vary. While some users may often engage with the social networking system 130, other users may less frequently so engage. Users may have limited engagement with the social networking system 130 for a variety of reasons. For example, they may choose to spend much of their social time in offline activities. As another example, even when online, they may choose to frequent other websites. Low levels of engagement impede communications among members of a social network and detract from the overall user experience of the social networking system 130. In contrast, a high level of engagement for all users fosters communication among users, and helps to realize the potential of the social networking system 130.

The engagement module 150 manages communications to users to increase their level of engagement with the social networking system 130. The engagement module 150 may control the type, content, and frequency of communications provided to users regarding activities that have transpired in their social networks. Such control encourages users having a low level of engagement with the social networking system 130 to increase their activities, as discussed in more detail below.

Figure 2:
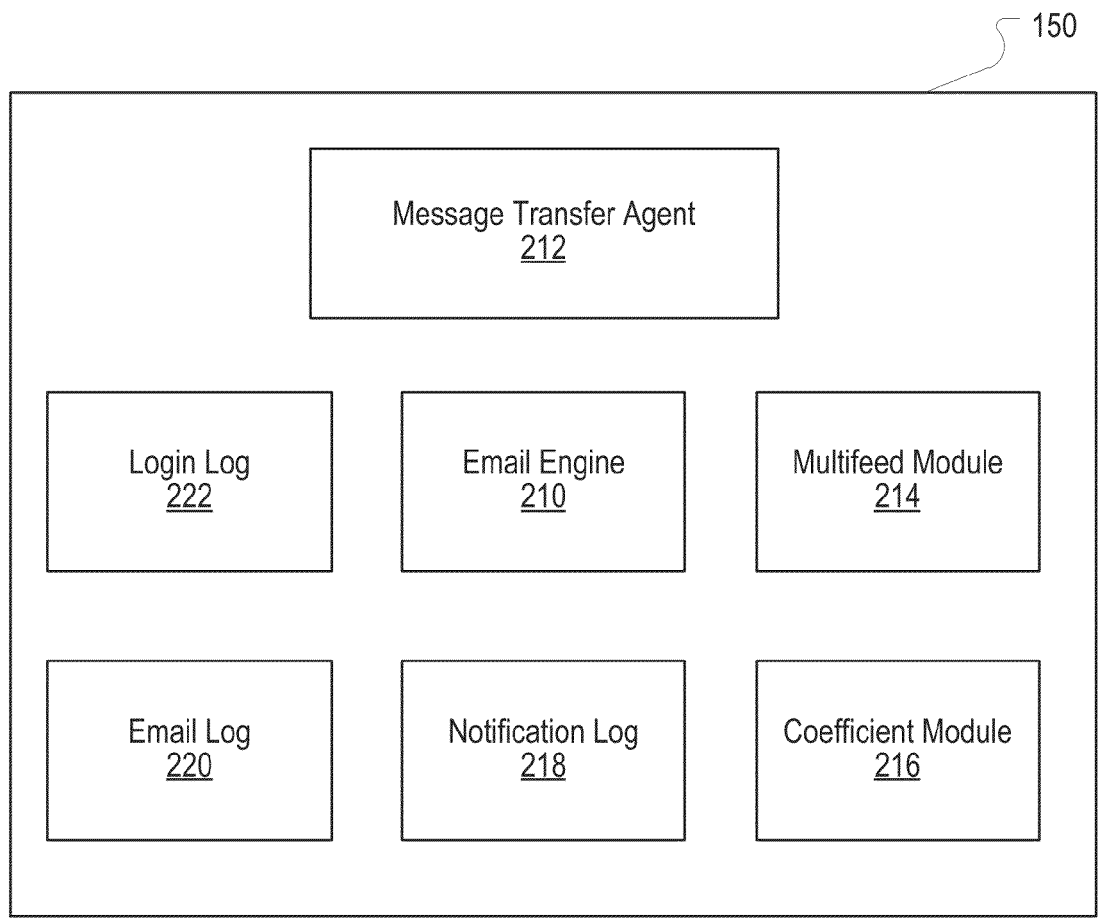
FIG. 2 is a block diagram of an engagement module of the social networking system in accordance with an embodiment of the invention.

FIG. 2 is a block diagram of the engagement module 150 of FIG. 1 in accordance with an embodiment of the invention. The engagement module 150 includes an email engine 210, a message transfer agent (MTA) 212, a multifeed module 214, a coefficient module 216, a notification log 218, an email log 220, and a login log 222. In an embodiment of the invention, the functions performed by the components (e.g., logs, engines, modules, etc.) shown in FIG. 2 may be variously replaced by, combined with, or integrated into other components.

Provision of communications for a user of the social networking system 130 may be managed and implemented by the engagement module 150 or other suitable functionality of the social networking system 130. The email engine 210 may control the direct or indirect provision of communications through the message transfer agent (MTA) 212 to the user. For example, the message transfer agent (MTA) 212 may provide communications for or to a user who receives such messages through email or other message systems external to the social networking system 130, such as the external system 120.

Figure 3:
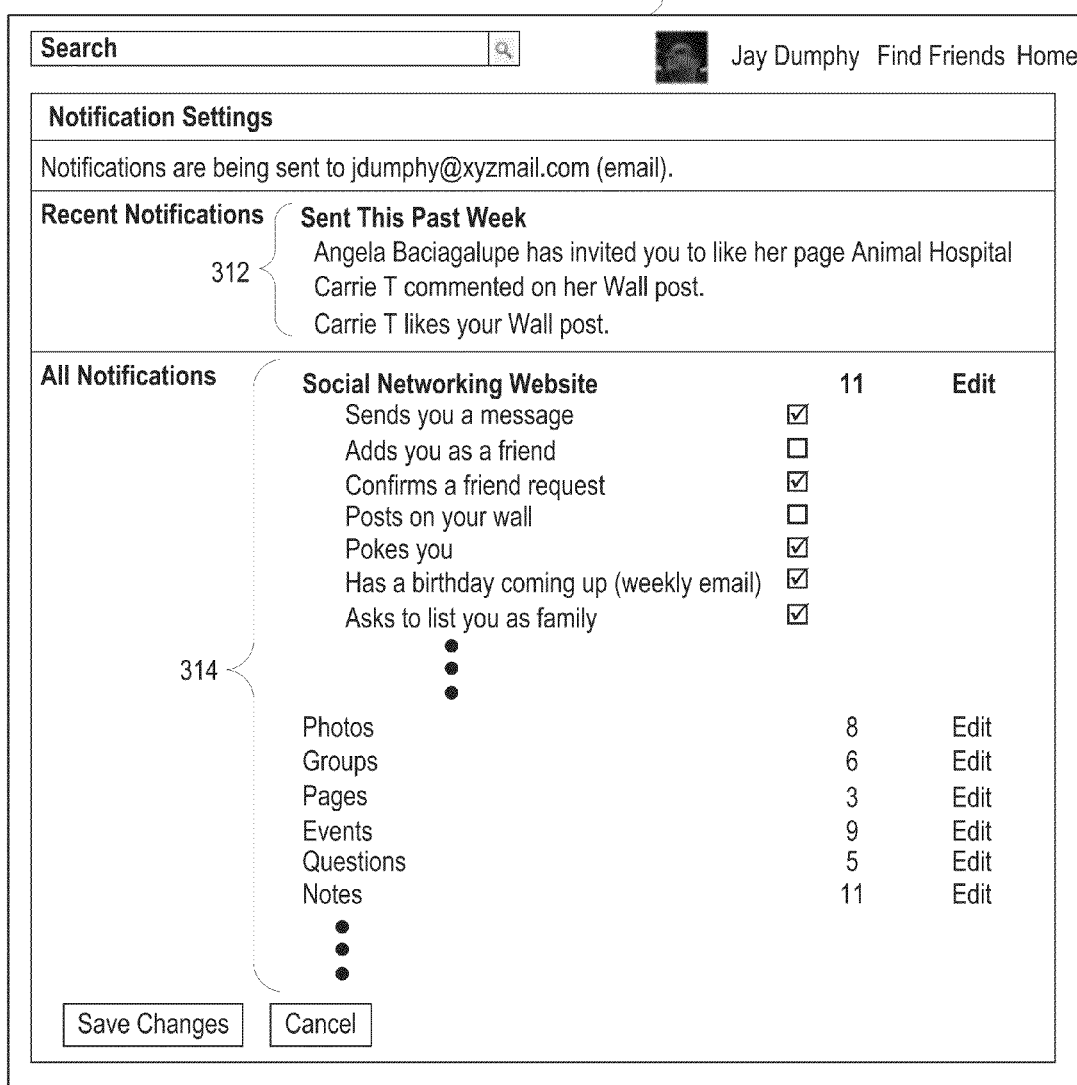
FIG. 3 shows a notification setting page with example types of notifications that may be provided by the social networking system in accordance with an embodiment of the invention.

The notification log 218 maintains information about notifications provided by the social networking system 130 for the user. Communications provided by the social networking system 130 for the user may include notifications about activities that have taken place within, or even outside, the social network of the user. A vast array of notifications may be provided to the user as email, text, RSS, or any other suitable type of communication vehicle. FIG. 3 is a notification setting page 310 that shows example types of notifications that may be provided by the social networking system 130 for a user regarding activities that have occurred in or outside her social network. Recent notifications 312 list the notifications that have been provided to the user in the recent past. As shown, the recent notifications 312 may include, for example, invitations provided to a user to "like" the webpage of a friend within the social network of the user of the social networking system 130. As another example, the recent notifications 312 may include notice that a friend within the social network of the user has commented about content that has been posted to an area within the social networking system 130 dedicated to the friend (e.g., "wall"). As yet another example, the recent notifications 312 may include an indication that a friend of the user "likes" content posted by the user to a wall. The recent notifications 312 may include other types of notifications as well.

Notification listing 314 enumerates example categories of notifications that may be provided for the user. Notification categories may include, for example, a social networking website, photos, groups, pages, events, questions, notes, links, video, help center, wall comments, places, deals, other updates, credits, and other applications. Each category may provide for notifications that are sent to the user when an event relating to the particular category occurs. For example, notifications concerning the social networking website category may be provided to the user when, for example, a friend of the user sends a message to the user, a person adds the user as a friend within a social network, a person confirms a request by the user to become friends, a friend of the user posts to the wall of the user, a person "pokes" the user, birthdays of friends of the user are imminent, another person requests that the user be identified as family member, another "likes" the post of the user (not shown), etc. As another example, notifications concerning the photos category may be provided for the user when, for example, the user is "tagged" in a photo, a person comments on a photo in which the user appears, the user uploads a photo to the social networking website, etc (not shown). Like notifications concerning the social networking website category and the photos category, notifications for other categories of the notification listing 314 may also be provided to the user upon the occurrence of certain activities related to the category. In an embodiment of the invention, other notifications and categories of notifications not shown in FIG. 3 may be included in the notification listing 314.

The notification setting page 310 may provide user-defined settings to control real-time, near real time, or intermittent provision of notifications upon the occurrence of the associated activity. For example, when a user has chosen to receive notifications when a friend of the user "likes" a post of the user, a notification may be sent in the form of an email as soon as the social networking system 130 determines that the event has occurred. In an embodiment of the invention, notifications may be accumulated and intermittently sent in batches at predetermined frequencies. For example, when a user has chosen to receive notifications about upcoming birthdays of friends, notifications about one or many birthdays of friends may be sent at a specific time interval (e.g., weekly), as shown in FIG. 3. In an embodiment of the invention, the timing and frequency of notifications may be determined by the user, the social networking system 130, or a combination thereof. In an embodiment of the invention, the notification settings selected by the user may be maintained in the user profile store 136.

In a "customize mode" for notifications, the notification setting page 310 may allow the user to select which of the possible notifications may be provided for the user. For example, the user may choose to receive a notification when someone in the social network sends a message to the user but may choose not to receive a notification when another in the social network adds the user as a friend. As another example, the user may choose to receive a notification when another person confirms the user as a friend to be added to her social network but may choose not to receive a notification when another person posts a message on the wall of the user. The customize mode allows the user to implement personalized notification preferences based on the importance of or interest level in the notifications, as determined by the user. In the customize mode, the notification settings may be set and changed entirely or partially by the user.

In a "minimal email" mode for notifications, all or a significant portion of the possible notifications are not provided to the user when the activities that would otherwise trigger the notifications occur. In the minimal email mode, the notification listing 314 may display a listing of notifications that are disabled (not shown in FIG. 3) and not selectable by the user. Disabling notifications prevents the user from selectively choosing which notifications to receive or not to receive, as is possible in the customize mode. The minimal email mode may be implemented to stop, prevent, or decrease the notifications provided by the social networking system 130 to the user about activities concerning her social network.

In an embodiment of the invention, control over notifications to be provided to the user may be exercised by the user, the social networking system 130, or a combination thereof. Likewise, selection of the customize mode or the minimal email mode may be made by the user, the social networking system 130, or a combination thereof.

The notification log 218 may include transactional information such as the category and type of notifications sent to the user, as well as the activities that prompt provision of the notifications. The notification log 218 also may include information regarding the date and time the notifications are provided to the user. In an embodiment of the invention, the notification log 218 may be implemented as a database table.

The multifeed module 214 may manage and track information about activities of connections of the user. For example, the multifeed module 214 may provide information about status information posted by friends. Status information may include temporary information published by a friend of the user that reflects the current thoughts and expressions of the friend. By its nature, posted status information may change frequently. The multifeed module 214 may track such changes. As another example, the multifeed module 214 may also track information about photos, videos, and other content posted by friends of the user.

The multifeed module 214 may also track stories concerning friends of the user. Stories may include various actions taken by the friends in the social networking system 130. For example, a story may involve one or more friends "liking" the photo of another friend. As another example, a story may involve one or more friends "liking" the status of another friend. As yet another example, a story may involve the publication of a comment or sharing by a friend or friends of the user. In addition to the information described herein, other types of information about the social network of the user also may be tracked by the multifeed module 214.

The login log 222 maintains information regarding the history of engagement by a user with the social networking system 130. The engagement information maintained by the login log 222 may include information regarding the date and times of prior visits by the user to the social networking system 130, including the date and time of the last visit by the user to the social networking system 130. In an embodiment of the invention, the login log 222 may maintain other types of engagement information, such as the history of logins to the social networking system 130 by the user or the history of certain actions taken by the user when engaged with the social networking system 130.

The email log 220 maintains information about emails provided to a user. The information maintained by the email log 220 may include transactional information about emails provided by the social networking system 130 through the message transmitter agent (MTA) 212 to an external message system used by the user. In particular, the email log 220 may contain information about the date and time of all emails provided to the user as well as other types of information. In an embodiment of the invention, the email log 220 may maintain transactional information about other communications provided to the user in addition to email.

The coefficient module 216 may provide coefficients as measures of relatedness between nodes in the social graph of the social networking system 130. For example, coefficients may indicate that a user is closer to her best friend than to another person befriended by the user. Coefficients may provide weights for edges between nodes in the social graph. For example, a greater weight may be given for a certain online game if the user plays the online game more often than another online game, or to a particular friend of the user if that friend frequently comments on the status of the user or of another friend of the user. The coefficient module 216 may store raw features about interactions between nodes, and has trained algorithms based thereon to provide general purpose functions to provide rankings, intelligence, suggestions, and recommendations.

Since there may be multiple paths between any two nodes, the measure of relatedness may also be based how many paths connect two nodes in the social graph. For example, if a User A makes two comments on an article posted by a User B, there may be two paths between User A and the posted article, one for each comment made by User A. Using the same example, if User A and User B are friends, there may be an additional path that indirectly connects User A to the article through User B, who posted the article. In some cases, as the number of paths between two nodes increases, the measure of relatedness between those nodes may also increase.

The coefficient module 216 may be a function, service, program, library, script, or other type of compiled or interpreted executable software module. It may be called by other services and applications for custom functions using the interactions. For example, the coefficient module 216 may be used to select stories or other types of content posted from the closest friends of a user, to sort bookmarks to online games that the user most often plays, and to sort a list of friends based on whom the user may most frequently communicate using instant message or chat services. The services and applications that employ, use, or call coefficients may be part of or external to the social networking system 130, including mobile applications and non-mobile applications.

The measure of relatedness may be based on a variety of possible interactions between nodes, whether internal or external to the social networking system 130. Nodes may include users, people, pages, or any object in the social graph. The determination of relatedness may be directional or directionless, and may depend on the interaction, closeness, weight between nodes, or on other relationships between nodes and edges in the social graph. As an example, the relatedness from one user (e.g., User A) to another user (e.g., User B) may be based on various interactions between the users including but are not limited to whether: User A commented on a photo of User B; User A liked content or a status update of User B; User A posted on the wall of User B; User A was on the same thread as User B; User A appears in the same photo as User B; a certain amount of time (e.g., days) transpires with (or without) User A engaging with User B or content of User B; User A linked to a comment of User B; User A shared content of User B with others; User A mentioned User B in a wall comment; User A viewed profile or other web page of User B; etc.

The foregoing interactions are merely examples and other interactions may be considered in the determination of coefficients between two nodes. In the foregoing example concerning the determination of User A's coefficient for User B, many of the possible interactions informing the coefficient are based on actions of User A. However, other interactions involving actions of User B may also be considered in the determination of User A's coefficient for User B. Such interactions may include but are not limited to whether: User B viewed a photo of User A; User B viewed an album of User A; a certain amount of time (e.g., days) transpires with (or without) User B engaging with User A or content of User A; etc. Further, the interactions that inform the determination of relatedness by the coefficients module may be based on various historical time durations. The determination of relatedness may also be based on a frequency of interaction within those historical time durations. For example, determinations of relatedness may be based on how many times or how frequently interactions occurred within the last 30 days, 60 days, 90 days, etc.

Various services may call the coefficient module 216 to use coefficients in their computations. For example, a Top Friends service may use the coefficients to determine which friends are most closely related to a user within the social graph. In other words, "top friends" may refer to a prioritized identification of connections of the user with whom she enjoys the highest measures of relatedness. The determination of top friends may be used by the social networking system 130 in a variety of contexts, such as: to identify participants to play online games; to identify relevant connections to the user for inclusion in her social network; to display a listing of photos of persons having highest relevance to the user; to otherwise display or list an identification of persons having highest relevance to the user; to identify persons with whom the user can engage in an instant message or chat session; etc. Other examples of services that may use coefficients include but are not limited to Top Users, Top Pages, Top Applications, Top Fans, etc.

The email engine 210, through a Top Friends or similar service, may call the coefficient module 216 to identify the friends of the user with high measures of relatedness. The measures of relatedness provided by the coefficient module 216 and relevant services may allow for the identification of top friends of the user. The identification of top friends, in turn, may allow information about activities regarding such friends to be prioritized over activities relating to others. Once prioritized, the information about activities may be selected for inclusion in communications for the user provided by the email engine 210. Such information may relate to, for example, photos and stories posted by the top friends of the user.

In an embodiment of the invention, to identify the friends having the highest measures of relatedness with the user, the friends may be ranked based on their respective coefficients with the user. Then, a predetermined number of friends may be selected from the top of the ranking. Once friends with the highest measures of relatedness are identified, the activities associated with them may be prioritized over the activities of others. The email engine 210 then may create references associated with the prioritized activities and embed the references in digest communications. The references may be classified into different types of information and presented separately in the digest communication according to their types.

The email engine 210 periodically may provide digest communications for the user. The digest communications may include references to activities in the social network of the user that have been prioritized based on their relevance to the user and then selected. In an embodiment of the invention, the digest communications may be email. In addition to email, the digest communications may be provided to the user as text, RSS, or any other suitable type of communication vehicle.

The digest communications may be sent when the user has not engaged with the social networking system 130 for a predetermined time period or time periods. The email engine 210 may compare information from the login log 222 with the predetermined time periods to determine whether to provide digest communications for the user. In particular, the email engine 210 may retrieve from the login log 222 the date and time of the last engagement of the user with the social networking system 130. The last user engagement with the social networking system 130 may be based on one or many considerations. For example, the last user engagement may be the most recent visit to the social networking system 130. In addition to the most recent visit to the social networking system 130, the last user engagement may be based on the most recent login to the social networking system 130 by the user. If the time since the last engagement is more than a predetermined time period, the email engine 210 may cause a digest communication to be provided to the user. In an embodiment of the invention, a predetermined time period may be two days or any other suitable period of time.

After a first digest communication is provided for the user, the email engine 210 may send additional digest communications at a first predetermined frequency corresponding to the end of every subsequent predetermined time period. For every instance when the time since the last engagement by the user with the social networking system 130 exceeds the predetermined time period, an additional digest communication may be provided to the user. For example, if the predetermined time period is two days, a user who has not visited the social networking system 130 for five days will receive two separate digest communications. From the time of the last visit by the user to the social networking system 130, one digest communication is provided after the second day, and the other digest communication is provided after the fourth day. A user that is engaged at a low level with the social networking system 130 thus may receive a series of digest communications at a first predetermined frequency during a period of no engagement with the social networking system 130.

In an embodiment of the invention, digest communications may be provided for the user at different frequencies during a period of no engagement by a user. For example, digest communications may be regularly provided at a first predetermined frequency for a first time period. In this example, the first predetermined frequency may be every two days and the first time period may be 14 days. After the first time period, the digest communications may be regularly provided at a second frequency for a second time period. In this example, the second frequency may be every 14 days and the second predetermined time period may be the time period after an initial 14 days after the most recent engagement by the user with the social networking system 130. In a similar manner, additional digest communications may be provided at other predetermined frequencies corresponding to other time periods. The predetermined frequencies and time periods may vary and assume any values determined by the social networking system 130 to be suitable.

The email engine 210 designs the digest communication to contain references about activities most relevant to the user that have occurred within her social network. When designed to contain relevant information, the digest communication is more likely to cause the user to engage with the social networking system 130. The email engine 210 identifies relevant information based on measures of relatedness provided by the coefficient module 216. The references to be embedded in the digest communication may come from many sources in the social networking system 130 including, for example, the notification log 218 and the multifeed module 214.

References may include pending notification counts as one type of information to be embedded in digest communications. The email engine 210 may consider counts of many pending notifications from the notification log 218 for possible inclusion in the digest communication. In an embodiment of the invention, information about notifications that is included in the digest communication may not be prioritized. Rather, the digest communication may include a count of total notifications that have been provided to the user over a predetermined time period. The count of notifications may be expressed as one aggregate total or divided into notification categories. Notification categories may include, for example, the number of friend requests sent to the user by others, the number of messages to which the user has not replied, the number of other notifications, and any count of notifications falling into other suitable notification categories. Notifications may be a distinct type of information about the social network of the user and presented in a separate, dedicated section in the digest communication.

In an embodiment of the invention, based on the coefficient module 216, the email engine 210 may include in the count, for example, only those notifications related to friends of the user having the highest measures of relatedness. To further focus on relevant information, the email engine 210 may select only a limited number of notifications to include in the count.

A complete or partial description of the notification themselves may not be included in the digest communication. For example, the identify of friends involved in the notifications and the message content associated with the notifications may be partially or wholly omitted from the digest communication. Descriptive information about the notifications may be omitted from the digest communications to encourage the user to directly engage with the social networking system 130.

References also may include friend identifications (i.e., "Facepile") as another type of information to be embedded in digest communications. Photos, statuses, and other possible content from the social network of the user may be provided from the multifeed module 214 to the email engine 210. The friends of the user who posted content in a relevant time period may be identified. Based on measures of relatedness provided by the coefficient module 216, the email engine 210 may identify the top friends of the user. Then, references identifying the top friends associated with the posted content may be included in the digest communication. However, like notifications, the content itself may be partially or wholly omitted from the digest communication to encourage the user to engage with the social networking system 130. In an embodiment of the invention, the number of friends identified in the digest communication may not exceed a predetermined limit, such as seven or any other suitable number.

In an embodiment of the invention, the top friends who posted content may be identified in the digest communication using their profile photos, their names, or any other kind of identifying information. The digest communication may further include a written indication that these users have posted photos, statuses, and other content. In an embodiment of the invention, the friend identification may be a distinct type of information about the social network of the user and separately presented in the digest communication. The identification of the users associated with photos, statuses, and other posted content may be located in a dedicated section of the digest communication that is separate from the section including the count of notifications.

References also may include stories (i.e., "top stories") as a type of information to be embedded in digest communications. Various stories from the social network of the user may be provided from the multifeed module 214 to the email engine 210. Based on measures of relatedness provided by the coefficient module 216, the stories most relevant to the user are identified by the email engine 210. In an embodiment of the invention, the measure of relatedness between the user and a story may be computed by identifying the actors involved in the story and summing their measures of relatedness with the user based on the coefficient module 216. Other techniques to determine appropriate stories for inclusion in the digest communication are possible. References about the identified top stories are then included in the digest communication. Like the notifications and the friend identifications, a complete or partial description of top stories may be omitted from the digest communication to encourage the user to engage with the social networking system 130. In an embodiment of the invention, the number of top stories included in the digest communication may be limited.

In an embodiment of the invention, the top stories may be located in a section of the digest communication that is separate from the section including friend identifications and the section including the count of pending notifications. Further, a digest communication may not include one or more of the sections corresponding to the count of pending notifications, the friend identifications, and the top stories. For example, if there has been no activity giving rise to a possible notification, friend identification, or top story since the last time the user engaged with the social networking system 130, then no account of that activity need appear in the digest communication.

FIG. 4 shows an example digest communication 410 in accordance with an embodiment of the invention. The digest communication 410 is provided for a user and includes a pending notification section 412, a friend identification section 414, and a top stories section 416. The notification section 412 includes a count of notifications in the categories of friend requests, messages, and notifications. The friend identification section 414 indicates that top friends have posted content in the social network of the user. The friend identification section 414 includes photos of the top friends and identifies some of them by name. The top stories section 416 includes two stories regarding friends of the user. The design and appearance of digest communications may vary from the example in FIG. 4.

The digest communication 410 is intended to encourage the user to engage directly with the social networking system 130. The digest communication 410 thus includes a button 418 to link to the social networking system 130. A button 420 allows the user to see a listing of all notifications. If the notifications provided to the user are currently turned off, then a link 422 allows the user to turn the notifications back on. A link 424 allows the user to unsubscribe from future provisions of digest communications. The button and links described herein, when selected by the user, are user selections provided to the social networking system 130.

In an embodiment of the invention, other types of information may be embedded in digest communications. For example, in addition to or instead of notification counts, friend identifications, and top stories, photos posted to the social networking system 130 by top friends of the user may be included as references to be included in the digest communications. Persons having the highest measures of relatedness of the user may be identified as top friends of the user. Then, the images posted by the top friends may be embedded in the digest communications for the user. The digest communication may include a message about the top friends in addition to the images themselves. For example, the message may be a statement identifying the images embedded in the digest communication as images posted by top friends of the user since the user last engaged with the social networking system 130. The images may located in a portion of the digest communication that is separate from the other types of information included in the digest communication.

Apart from notifications, friend identifications, stories, and photos, any type of information that may be of potential interest to the user may be referenced in digest communications to encourage the user to engage directly with the social networking system 130. In an embodiment of the invention, types of information to be embedded in digest communications may be provided or tracked by the multifeed module 214 or a different module of the social networking system 130. The types of information may be referenced in dedicated or combined sections of the digest communications.

Figure 5:
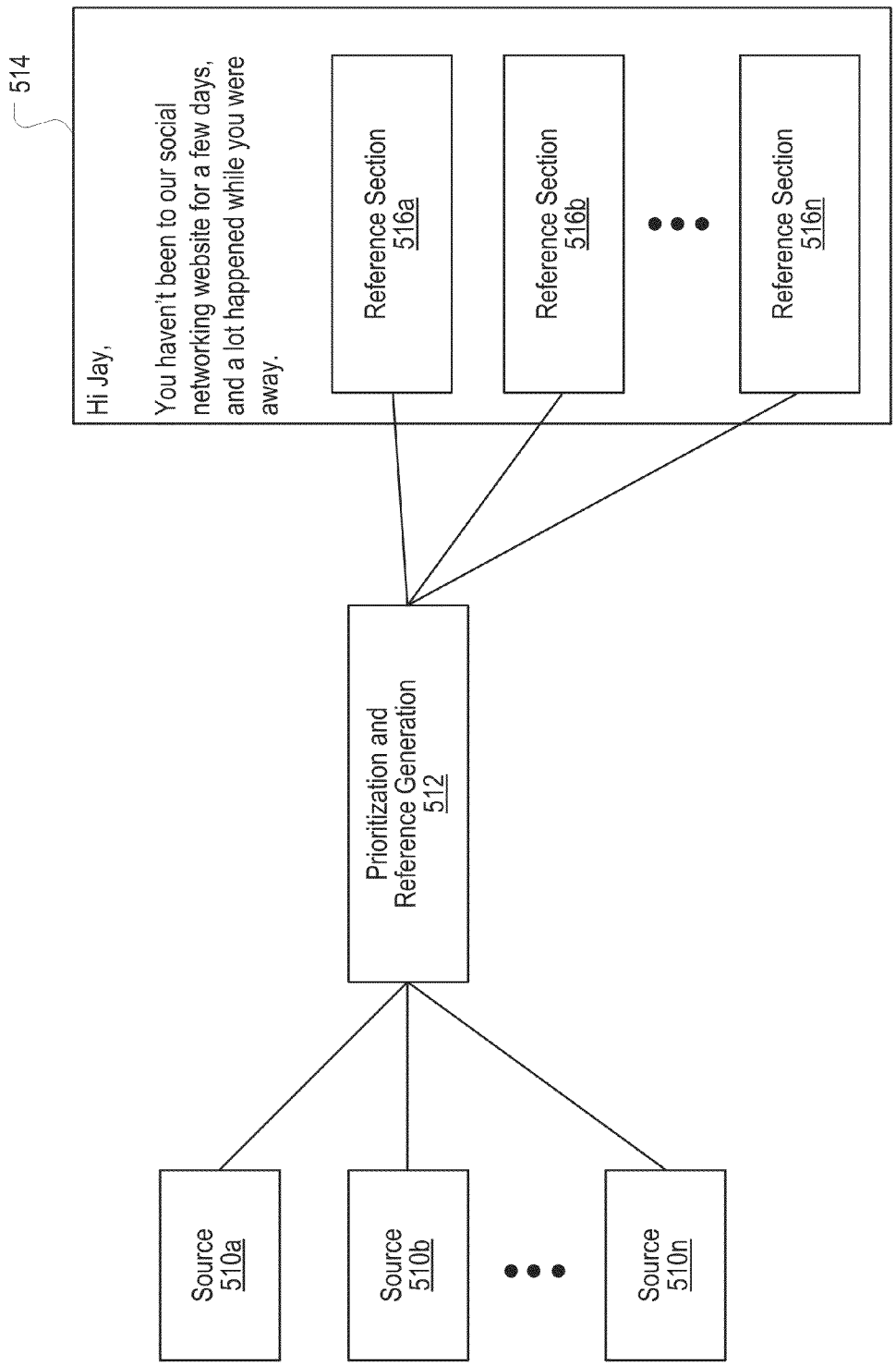
FIG. 5 illustrates creation of a digest communication in accordance with an alternative embodiment of the invention.

FIG. 5 illustrates the creation of a digest communication for provision to a user in accordance with an alternative embodiment of the invention. Sources 510a-n represent repositories of information regarding different types of activity that have occurred in the social networking system 130. The information maintained in the sources 510a-n may originate in the social networking system 130 or external systems 120 having information-sharing relationships with the social networking system 130. The sources 510a-n may provide large amounts of social network information having potential relevance to the user. In an embodiment, the sources 510a-n may include the multifeed module 214 and the notification log 218 of FIG. 2. The sources 510a-n also may store information apart from the information maintained or tracked by the multifeed module 214 and the notification log 218.

The information maintained in the sources 510a-n is provided to prioritization and reference generation 512. Prioritization and reference generation 512 sorts the information and prioritizes it based on relevance to the user. Prioritization may implement computational algorithms to quantitatively rank information by its relevance to the user. For example, the prioritization and reference generation 512 may implement algorithms of the coefficient module 216 and related services to determine measures of relatedness between the user and others and select activities associated with persons having the highest measures of relatedness.

Once information of threshold relevance is identified, the prioritization and reference generation 512 may create references for the most relevant information. The references then may be provided for an inclusion in a digest communication 514. The digest communication 514 includes reference sections 516a-n. The reference sections 516a-n may correspond to the different types of information provided by the sources 510a-n. In an embodiment of the invention, the number of reference sections 516a-n presented in the digest communication may not be equal to the number of sources 510a-n. In an embodiment of the invention, if the extent of references for a particular one of the reference sections 516a-n does not reach a threshold, the particular reference section may be omitted from the digest communication 514.

The digest communication 514 may include some references associated with activities that have occurred in the social network of the user. The digest communications may not include a complete description of the activities, but rather may include only a partial description. The digest communications may omit some description about the activities to encourage the user to engage with the social networking system 130 and to access the entirety of the descriptions for the referenced activities. In an embodiment of the invention, the reference sections 516a-n may present all or part of the information about activities that has been determined by the prioritization and reference generation 512 to be most relevant to the user.

As digest communications may be periodically provided to the user, the provision of notifications by the social networking system 130 to the user may be stopped in certain circumstances. When the level of engagement of the user with the social networking system 130 within a prior predetermined interval of time is greater than or equal to a threshold value, notifications to the user are ceased to encourage the user to increase her level of engagement with the social networking system 130. When the level of engagement of the user with the social networking system 130 within the prior predetermined interval of time is less than a threshold value, notifications are provided to the user to encourage the user to increase her level of engagement with the social networking system 130. In an embodiment of the invention, the threshold value may be determined by empirical data. Other techniques to determine the threshold value are possible, and other suitable threshold values are possible.

For example, the email engine 210 or the social networking system 130 may define a variable L28, which represents the number of times that a user has visited the social networking system 130 in the last 28 days. Further, the threshold value may be 15. Thus, if L28 is less than 15 for a user, then the social networking system 130 may provide notifications for the user when such provision is consistent with the policies of the social networking system 130 and the selection of the user. However, if L28 is greater than or equal to 15, then the social networking system 130 automatically may cease the provision of notifications for the user.

If the provision of notifications to the user is stopped, the notifications may later resume. As time proceeds, the engagement module 150 may continually monitor the predetermined prior interval of time to compare the level of engagement of the user with the social networking system 130 against the threshold value. For example, if the level of engagement of the user with the social networking system 130 is greater than the threshold value during a first interval of time, notifications for the user may be turned off. During a second interval of time subsequent to the first interval of time, the level of engagement may decrease. If the decreased level of engagement falls below the threshold value, then the engagement module 150 may resume provision of notifications for the user. In a similar manner for later time intervals, the engagement module 150 may cease and resume the provision of notifications based on comparison of the levels of engagement during the time intervals against a threshold value.

The level of engagement of a user with the social networking system 130 may be based on one or many factors. In an embodiment of the invention, the level of engagement may be based on the number of visits to the social networking system 130. In another embodiment, the level of engagement of a user may be based on additional or alternative factors related to participation by the user in the social networking system 130, such as the number of logins by the user, degree of interaction with other users, and the types of interaction with other users of the social networking system 130. The prior predetermined interval of time may be a predetermined number of prior days, weeks, months, years, or any other time durations.

If the social networking system 130 decides to automatically cease provision of notifications, or if the user selects to cease provision of notifications, all possible notifications may cease. In an embodiment of the invention, despite a decision to stop notifications, the provision of some notifications nonetheless may be deemed mandatory based on their deemed importance to the guidelines of the social networking system 130 or other considerations. Such notifications may continue to be provided for the user upon occurrence of related activities. For example, if a user is identified in photo posted by another (i.e., tagged), a notification may be sent to the user even if the social networking system 130 or the user has otherwise decided to stop notifications for the user. As another example, if the location of a user is posted by another, a corresponding notification may be sent to the user even if other notifications have ceased. Other types of notifications also may not be turned off.

When notifications are turned off by the social networking system 130, the user may be so informed. FIGS. 6A-6B show messages provided by the social networking system 130 for the user regarding the management of notifications. FIG. 6A shows an example message 610 to inform a user that the provision of notifications to her has ceased. The message 610 includes a link 612 to allow the user to choose to turn back on notifications, such as email. When the link 612 is selected, an opt out page may be presented to the user. FIG. 6B shows an example opt out page 620. The opt out page requests confirmation from the user that notifications should resume. The opt out page 620 includes a button 622 to allow the user to confirm resumption of notifications and a button 624 to cancel resumption of notifications.

FIG. 7 shows a notification setting page allowing the user to resume the provision of notifications. A notification setting page 710 is similar to the notification setting page 310 (shown in FIG. 3) and includes recent notifications 712 and notification listing 714. The notification setting page 710 additionally includes a notification handling section 720. The notification handling section 720 allows the user to toggle between the provision of notifications and the cessation of notifications. The toggling may be performed by appropriate selection of a check box 722. As shown, the check box 722 is checked to indicate that all notifications to the user should cease. Accordingly, there are no notifications as recent notifications 712 and the notification listing 714 is disabled. To resume notifications, the check box 722 may be left unchecked.

Figure 8:
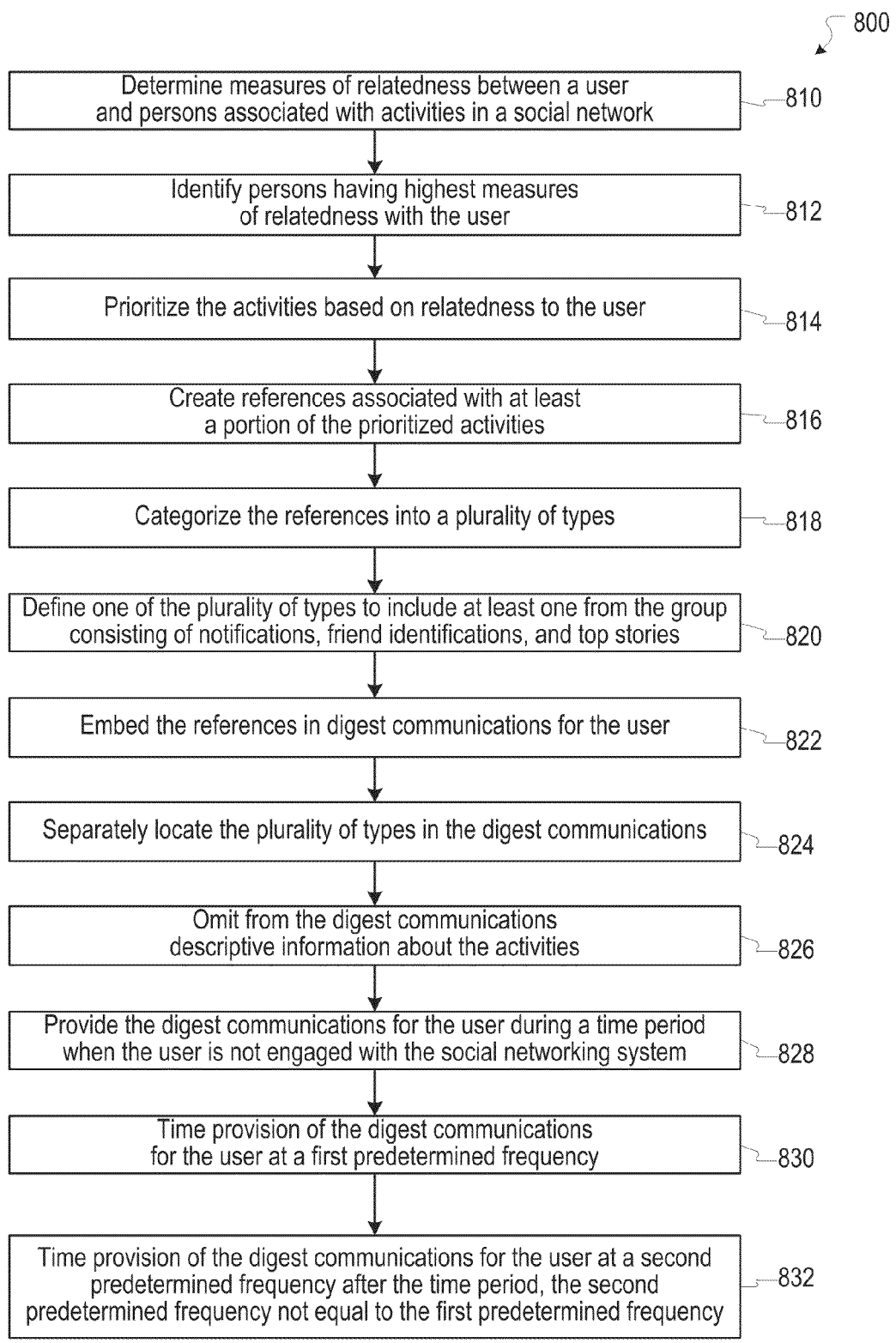
FIG. 8 is a process for managing digest communications in accordance with an embodiment of the invention.

FIG. 8 shows an example process for managing digest communications in accordance with an embodiment of the invention. In block 810, measures of relatedness between a user and persons associated with activities in a social network are determined. In block 812, persons having highest measures of relatedness with the user are identified. In block 814, the activities are prioritized based on relatedness to the user. In block 816, references associated with at least a portion of the prioritized activities are created. In block 818, the references are categorized into a plurality of types. In block 820, one of the plurality of types is defined to include at least one from the group consisting of notifications, friend identifications, and top stories. In block 822, the references are embedded in digest communications for the user. In block 824, the plurality of types are separately located in the digest communications. In block 826, descriptive information about the activities are omitted from the digest communications. In block 828, the digest communications for the user are provided during a time period when the user is not engaged with the social networking system. In block 830, provision of the digest communications for the user is timed at a first predetermined frequency. In block 832, provision of the digest communications for the user is timed at a second predetermined frequency after the time period, the second predetermined frequency not equal to the first predetermined frequency.

Figure 9:
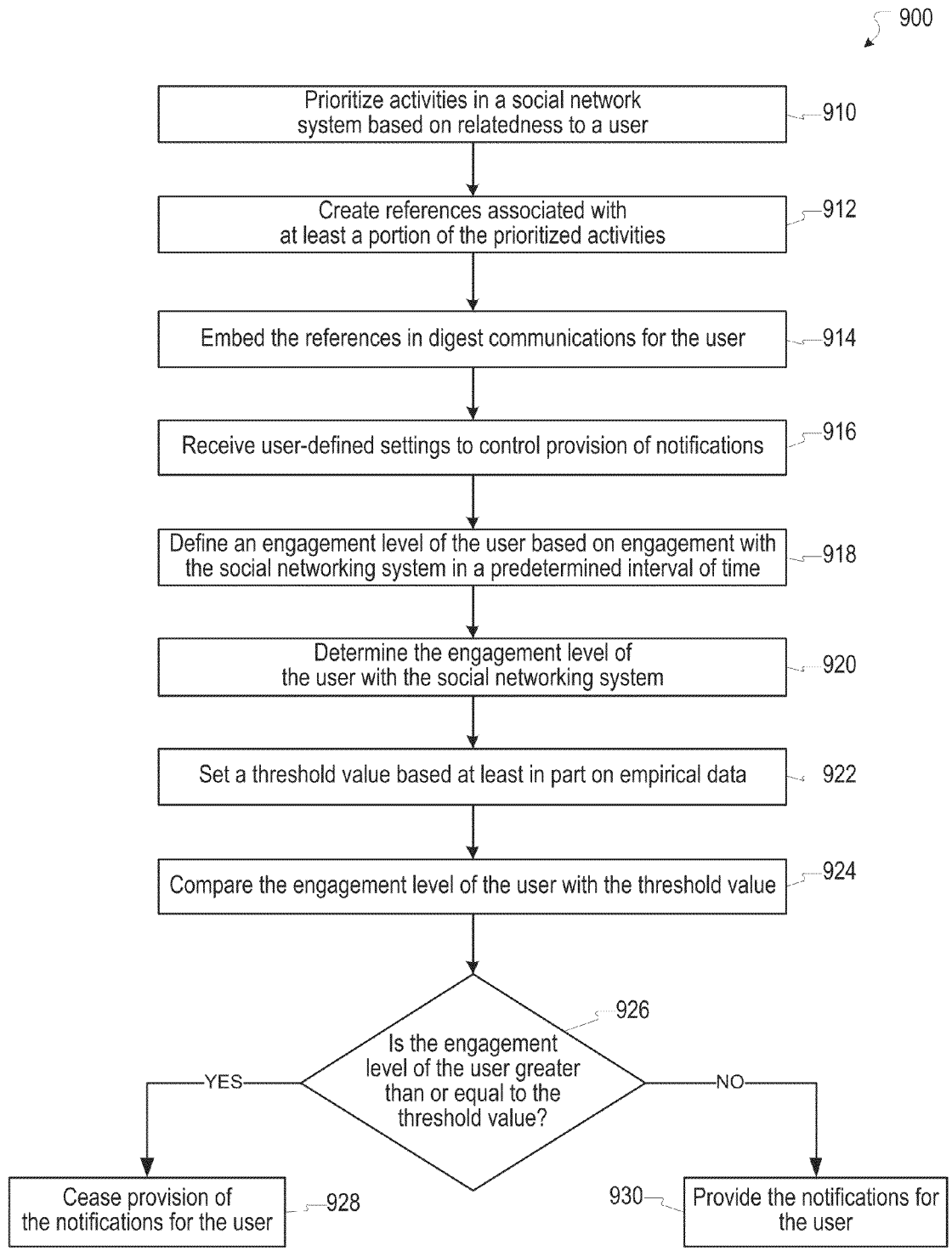
FIG. 9 is a process for managing notifications in accordance with an embodiment of the invention.

FIG. 9 is an example of a process for managing notifications in accordance with an embodiment of the invention. In block 910, activities in a social network system are prioritized based on relatedness to a user. In block 912, references associated with at least a portion of the prioritized activities are created. In block 914, the references are embedded in digest communications for the user. In block 916, user-defined settings to control provision of notifications are received. In block 918, an engagement level of the user is defined based on engagement with the social networking system in a predetermined interval of time. In block 920, the engagement level of the user with the social networking system is determined. In block 922, a threshold value is set based at least in part on empirical data. In block 924, the engagement level of the user is compared with the threshold value. In block 926, it is determined whether the engagement level of the user is greater than or equal to the threshold value. If the answer is "Yes" for block 926, provision of the notifications for the user is ceased in block 928. If the answer is "No" for block 926, the notifications are provided for the user in block 930. In an embodiment of the invention, the process 900 may proceed to block 910 after the block 928 and the block 930.

In an embodiment of the invention, the process 800 and the process 900 may be entirely or partially performed by the engagement module 150. In an embodiment of the invention, the process 800 and the process 900 may be performed at least in part by the social networking system 130.

Conclusion

Figure 10:
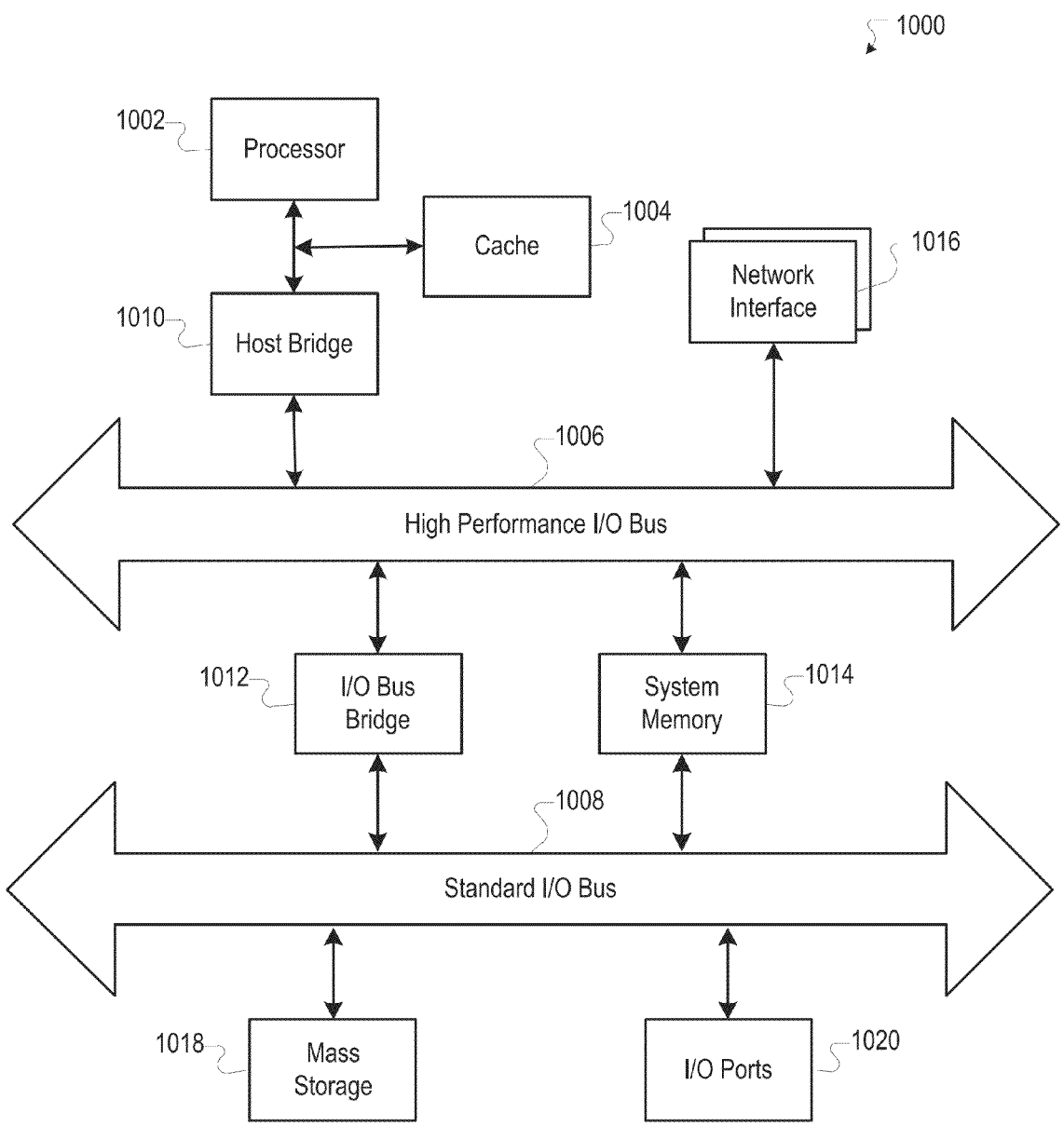
FIG. 10 is a diagram of a computer system in accordance with an embodiment of the invention.

The foregoing processes and features can be implemented by a wide variety of machine and computer system architectures and in a wide variety of network and computing environments. FIG. 10 illustrates an example of a computer system 1000 that may be used to implement one or more of the computing devices identified above. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 130, the user device 110, and the external system 120, or a component thereof. In an embodiment of the invention, the computer system 1000 may be one server among many that constitutes all or part of the social networking system 130.

The computer system 1000 includes a processor 1002, a cache memory 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to bus 1006. The computer system 1000 may further include video memory and a display device coupled to the video memory (not shown). Mass storage 1018 and I/O ports 1020 couple to the bus 1008. The computer system 1000 may optionally include a keyboard and pointing device, a display device, or other input/output devices (not shown) coupled to the bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Furthermore, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1 and then accessed and executed by processor 1002.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described that may be preferences or requirements for some embodiments but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    identifying a low engagement user of a plurality of users of a social networking system, the low engagement user identified based on a measure of interaction of the low engagement user in a social networking system;
    identifying one or more additional users of the plurality of users who have established a connection to the low engagement user in the social networking system;
    determining a measure of relatedness between the low engagement user and one or more of the additional users;
    identifying a group of the additional users having a threshold level of relatedness with the low engagement user;
    ranking the activities performed in the social networking system by the identified group of additional users, the ranking based at least in part on the determined measure of relatedness;
    selecting a plurality of the ranked activities based on the ranking;
    creating by a processor, a plurality of notifications associated with at least a portion of the selected activities;
    generating a digest communication that comprises the plurality of notifications; and
    sending, in a communication channel external to the social networking system, the digest communication for display to the low engagement user.

2. The method of claim 1 further comprising providing the digest communications for the user during a time period when the user is not engaged with the social networking system.

3. The method of claim 2 further comprising timing provision of the digest communications for the user at a first specified frequency.

4. The method of claim 3 further comprising timing provision of the digest communications for the user at a second specified frequency after the time period, the second predetermined frequency not equal to the first specified frequency.

5. The method of claim 1 further comprising determining measures of relatedness between the low engagement user and persons associated with the activities.

6. The method of claim 5 further comprising identifying persons having highest measures of relatedness with the low engagement user.

7. The method of claim 1 further comprising omitting from the digest communications descriptive information about the activities.

8. The method of claim 1 further comprising:
    categorizing the plurality of notifications into a plurality of types; and
    separately locating the plurality of types in the digest communications.

9. The method of claim 8 further comprising defining one of the plurality of types to include at least one from the group consisting of notifications, friend identifications, and top stories.

10. The method of claim 1 further comprising:
    providing notifications concerning the activities; and
    determining an engagement level of the low engagement user with the social networking system.

11. The method of claim 10 further comprising defining the engagement level of the low engagement user based on engagement with the social networking system in a specified interval of time.

12. The method of claim 10 further comprising setting a threshold number based at least in part on empirical date.

13. The method of claim 12 further comprising comparing the engagement level of the low engagement user with the threshold value.

14. The method of claim 13 further comprising ceasing provision of the notifications for the low engagement user when the engagement level of the low engagement user is greater than the threshold value.

15. The method of claim 13 further comprising providing notifications for the low engagement user when the engagement level of the low engagement user is less than the threshold value.

16. The method of claim 13 further comprising resuming the notifications for the low engagement user based on selection by the user.

17. The method of claim 10 further comprising receiving user-defined settings to control provision of the notifications.

18. The method of claim 1 wherein the notifications are provided in real time based on occurrence of the activities.

19. The method of claim 1, wherein generating a digest communication further comprises:
    for each notification of the plurality of notifications, identifying one or more activity types of the corresponding ranked activity of the notification, the digest comprising a plurality of regions, each region includes one or more notifications of a particular activity type.

20. A system comprising:
    at least one processor; and
    a memory storing instructions configured to instruct the at least one processor to:
    identify a low engagement user of a plurality of users of a social networking system, the low engagement user identified based on a measure of interaction of the low engagement user in a social networking system;
    identify one or more additional users of the plurality of users who have established a connection to the low engagement user in the social networking system;
    determine a measure of relatedness between the low engagement user and one or more of the additional users;
    identify a group of the additional users having a threshold level of relatedness with the low engagement user;
    rank the activities performed in the social networking system by the identified group of additional users, the rank based at least in part on the determined measure of relatedness;

select a plurality of the ranked activities based on the rank;
create a plurality of notifications associated with at least a portion of the selected activities;
generate a digest communication that comprises the plurality of notifications; and
send, in a communication channel external to the social networking system, the digest communication for display to the low engagement user.

21. A non-transitory computer-storage medium storing computer-executable instructions that, when executed, cause a computer system to perform a computer-implemented method comprising:
identifying a low engagement user of a plurality of users of a social networking system, the low engagement user identified based on a measure of interaction of the low engagement user in a social networking system;
identifying one or more additional users of the plurality of users who have established a connection to the low engagement user in the social networking system;
determining a measure of relatedness between the low engagement user and one or more of the additional users;
identifying a group of the additional users having a threshold level of relatedness with the low engagement user;
ranking activities performed in the social networking system by the identified group of additional users, the ranking based at least in part on the determined measure of relatedness;
selecting a plurality of the ranked activities based on the ranking;
creating a plurality of notifications associated with at least a portion of the selected activities;
generating a digest communication that comprises the plurality of notifications; and
sending, in a communication channel external to the social networking system, the digest communication for display to the low engagement user.

* * * * *